United States Patent
Hsieh et al.

(10) Patent No.: US 11,589,190 B2
(45) Date of Patent: Feb. 21, 2023

(54) APPARATUSES AND METHODS FOR MULTIMEDIA BROADCAST MULTICAST SERVICE (MBMS)-BASED EMERGENCY BROADCAST

(71) Applicant: Wistron Corp., New Taipei (TW)

(72) Inventors: Cheng-Ying Hsieh, New Taipei (TW); Yu-Ming Tseng, New Taipei (TW)

(73) Assignee: WISTRON CORP., New Taipei (TW)

( * ) Notice: Subject to any disclaimer, the term of this patent is extended or adjusted under 35 U.S.C. 154(b) by 16 days.

(21) Appl. No.: 17/149,653

(22) Filed: Jan. 14, 2021

(65) Prior Publication Data

US 2022/0150670 A1    May 12, 2022

(30) Foreign Application Priority Data

Nov. 9, 2020  (TW) ................. 109138961

(51) Int. Cl.

| | |
|---|---|
| *H04W 4/06* | (2009.01) |
| *H04W 4/90* | (2018.01) |
| *H04W 28/06* | (2009.01) |
| *H04W 80/02* | (2009.01) |
| *H04W 4/16* | (2009.01) |

(52) U.S. Cl.
CPC ............. *H04W 4/06* (2013.01); *H04W 4/16* (2013.01); *H04W 4/90* (2018.02); *H04W 28/06* (2013.01); *H04W 80/02* (2013.01)

(58) Field of Classification Search
CPC .......... H04W 4/06; H04W 4/18; H04W 4/22; H04W 40/24; H04W 4/90; H04W 24/06; H04W 28/04; H04W 48/16; H04W 72/005; H04W 76/00; H04W 76/007; H04W 76/40; H04W 36/14; H04W 36/30; H04W 80/04; H04W 8/065; H04W 92/24

See application file for complete search history.

(56) References Cited

U.S. PATENT DOCUMENTS

| 8,838,062 | B2* | 9/2014 | Hokao | ............. | H04W 4/90 |
|---|---|---|---|---|---|
| | | | | | 455/412.2 |
| 2007/0086437 | A1* | 4/2007 | DiFazio | ................ | H04W 8/18 |
| | | | | | 370/352 |
| 2008/0084837 | A1* | 4/2008 | Watanabe | .......... | H04W 72/005 |
| | | | | | 370/312 |

(Continued)

FOREIGN PATENT DOCUMENTS

WO   WO 2010/077190 A1   7/2010

OTHER PUBLICATIONS

3GPP TS 24.008 V17.1.0; Technical Specification Group Core Network and Terminals; Mobile radio interface Layer 3 specification; Core network protocols; Stage 3, Dec. 2020, 798 pages, 3GPP Organizaitonal Partners Publications' Office, France.

*Primary Examiner* — Jean A Gelin

(57) ABSTRACT

A mobile communication device including a wireless transceiver and a controller is provided. The wireless transceiver performs wireless transmission and reception to and from a mobile communication network. The controller receives a Protocol Data Unit (PDU) associated with a Multimedia Broadcast Multicast Service (MBMS) from the mobile communication network via the wireless transceiver, and converts the PDU to a format which allows a dialer application to play the MBMS in response to the MBMS belonging to an emergency service type.

14 Claims, 9 Drawing Sheets

(56) References Cited

U.S. PATENT DOCUMENTS

| | | | | |
|---|---|---|---|---|
| 2011/0275342 A1* | 11/2011 | Ramle | ............ | H04W 76/50 |
| | | | | 455/404.1 |
| 2012/0064854 A1* | 3/2012 | Youn | ............ | H04W 74/0833 |
| | | | | 455/404.1 |
| 2012/0135702 A1* | 5/2012 | Hokao | ............ | H04W 4/90 |
| | | | | 455/404.1 |
| 2013/0044668 A1* | 2/2013 | Purnadi | ............ | H04W 36/0058 |
| | | | | 370/312 |
| 2016/0105781 A1* | 4/2016 | Wells | ............ | H04M 7/0024 |
| | | | | 455/466 |
| 2016/0183156 A1* | 6/2016 | Chin | ............ | H04W 36/0022 |
| | | | | 370/331 |
| 2016/0360383 A1* | 12/2016 | Morita | ............ | H04W 76/40 |
| 2020/0120570 A1* | 4/2020 | Youn | ............ | H04W 76/11 |
| 2020/0336953 A1* | 10/2020 | Liu | ............ | H04W 48/02 |
| 2020/0404739 A1* | 12/2020 | Thiebaut | ............ | H04W 76/40 |
| 2021/0021979 A1* | 1/2021 | Chiang | ............ | H04M 3/28 |
| 2021/0304742 A1* | 9/2021 | Hung | ............ | G10L 25/18 |

\* cited by examiner

APPARATUSES AND METHODS FOR MULTIMEDIA BROADCAST MULTICAST SERVICE (MBMS)-BASED EMERGENCY BROADCAST

CROSS REFERENCE TO RELATED APPLICATIONS

This application claims priority of Taiwan Patent Application No. 109138961, filed on Nov. 9, 2020, the entirety of which is incorporated by reference herein.

BACKGROUND OF THE APPLICATION

Field of the Application

The application generally relates to mobile communications and, more particularly, to apparatuses and methods for Multimedia Broadcast Multicast Service (MBMS)-based emergency broadcast.

Description of the Related Art

With the growing demand for ubiquitous computing and networking, various mobile communication technologies have been developed, including Global System for Mobile communications (GSM) technology, General Packet Radio Service (GPRS) technology, Enhanced Data rates for Global Evolution (EDGE) technology, Universal Mobile Telecommunications System (UMTS) technology, Interim Standard 95 (IS-95) technology, Code Division Multiple Access 2000 (CDMA-2000) technology, CDMA-2000 1× Evolution-Data Optimized or Evolution-Data (CDMA-2000 1× EV-DO) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, and Time-Division LTE (TD-LTE) technology, etc. In particular, service networks utilizing the GSM/GPRS/EDGE technology are called 2G mobile communication networks; service networks utilizing the WCDMA/CDMA-2000/TD-SCDMA technology are called 3G mobile communication networks; and service networks utilizing the LTE/LTE-A/TD-LTE technology are called 4G mobile communication networks.

For public safety, every mobile communication network mentioned above supports the Public Warning System (PWS) designed to deliver warning information to mobile communication devices via the broadcast channel. However, the broadcast channel can only carry cell broadcast messages that contain a small amount of text with limited information. On the other hand, dedicated data channels are mostly congested when a major disaster (e.g., earthquake, tsunami, or fire) strikes, causing users to be blocked from making calls to obtain more information for coping with the emergency situation.

Therefore, it is desirable to have a more flexible and efficient way of delivering emergency information.

BRIEF SUMMARY OF THE APPLICATION

In a first aspect of the application, a mobile communication device comprising a wireless transceiver and a controller is provided. The wireless transceiver is configured to perform wireless transmission and reception to and from a mobile communication network. The controller is coupled to the wireless transceiver, and is configured to receive a Protocol Data Unit (PDU) associated with a Multimedia Broadcast Multicast Service (MBMS) from the mobile communication network via the wireless transceiver, and convert the PDU to a format which allows a dialer application to play the MBMS in response to the MBMS belonging to an emergency service type.

In a first implementation form of the first aspect of the application, the dialer application is a native dialer application of an Operating System (OS).

In a second implementation form of the first aspect of the application, the MBMS is an evolved MBMS (eMBMS) when the mobile communication network is a fourth generation (4G) network; or the MBMS is a Further evolved MBMS (FeMBMS) when the mobile communication network is a fifth generation (5G) network.

In a third implementation form of the first aspect of the application, the controller is further configured to receive system broadcast information from the mobile communication network via the wireless transceiver, and determine whether the MBMS belongs to the emergency service type according to the system broadcast information.

In a fourth implementation form of the first aspect of the application in combination with the third implementation form of the first aspect of the application, the system broadcast information comprises a System Information Block type 2 (SIB 2) and a System Information Block type 13 (SIB 13), and the controller is further configured to determine whether the MBMS is available at a location of the mobile communication device according to the SIB 2, and determine whether the MBMS belongs to the emergency service type according to a Mobile Country Code (MCC) and an MBMS service ID in the SIB 13 in response to the MBMS being available at the location of the mobile communication device.

In a fifth implementation form of the first aspect of the application, the controller is further configured to retrieve a Logical Channel Identifier (LCD) from a header of the PDU in response to the MBMS belonging to the emergency service type, and the converting of the PDU to the format which allows the dialer application to play the MBMS is performed in response to the LCD corresponding to the emergency service type.

In a sixth implementation form of the first aspect of the application, the PDU is a Media Access Control (MAC) PDU, and the format conversion of the PDU comprises: converting the PDU from a Multicast Channel (MCH) format to a Downlink Shared Channel (DL-SCH) format; establishing a Service Access Point (SAP) between the MCH in a MAC layer and a Downlink Traffic Channel (DTCH) in a Radio Link Control (RLC) layer; and passing the PDU from the MAC layer to the RLC layer via the SAP.

In a seventh implementation form of the first aspect of the application, the controller is further configured to mute a microphone function of the dialer application when the dialer application is playing the MBMS.

In a second aspect of the application, a method for MBMS-based emergency broadcast, executed by a mobile communication device, is provided. The method comprises the following steps: receiving a PDU associated with an MBMS from a mobile communication network; and converting the PDU to a format which allows a dialer application to play the MBMS in response to the MBMS belonging to an emergency service type.

In a first implementation form of the second aspect of the application, the dialer application is a native dialer application of an OS.

In a second implementation form of the second aspect of the application, the MBMS is an eMBMS when the mobile communication network is a 4G network; or the MBMS is a FeMBMS when the mobile communication network is a 5G network.

In a third implementation form of the second aspect of the application, the method further comprises the following steps: receiving system broadcast information from the mobile communication network; and determining whether the MBMS belongs to the emergency service type according to the system broadcast information.

In a fourth implementation form of the second aspect of the application in combination with the third implementation form of the second aspect of the application, the system broadcast information comprises a SIB 2 and a SIB 13, and the method further comprises the following steps: determining whether the MBMS is available at a location of the mobile communication device according to the SIB 2; and determining whether the MBMS belongs to the emergency service type according to an MCC and an MBMS service ID in the SIB 13 in response to the MBMS being available at the location of the mobile communication device.

In a fifth implementation form of the second aspect of the application, the method further comprises the following steps: retrieving an LCID from a header of the PDU in response to the MBMS belonging to the emergency service type; wherein the converting of the PDU to the format which allows the dialer application to play the MBMS is performed in response to the LCID corresponding to the emergency service type.

In a sixth implementation form of the second aspect of the application, the PDU is a MAC PDU, and the format conversion of the PDU comprises: converting the PDU from an MCH format to a DL-SCH format; establishing an SAP between the MCH in a MAC layer and a DTCH in an RLC layer; and passing the PDU from the MAC layer to the RLC layer via the SAP.

In a seventh implementation form of the second aspect of the application, the method further comprises the following step: muting a microphone function of the dialer application when the dialer application is playing the MBMS.

Other aspects and features of the present application will become apparent to those with ordinarily skill in the art upon review of the following descriptions of specific embodiments of the apparatuses and the methods for MBMS-based emergency broadcast.

BRIEF DESCRIPTION OF THE DRAWINGS

The present application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
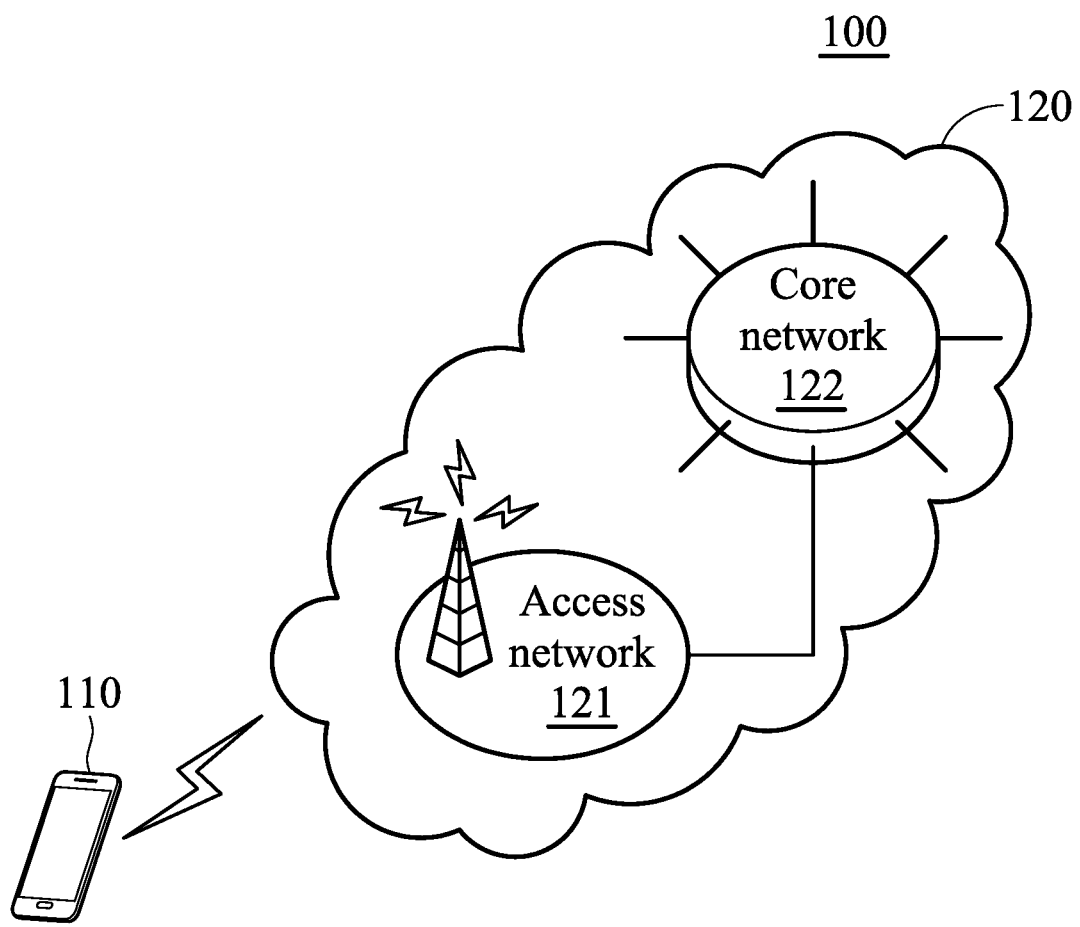
FIG. 1 is a block diagram of a mobile communication environment according to an embodiment of the application.

FIG. 1 is a block diagram of a mobile communication environment according to an embodiment of the application.

As shown in FIG. 1, the mobile communication environment 100 may include a mobile communication device 110 and a mobile communication network 120. The mobile communication device 110 may wirelessly connect to the mobile communication network 120 to obtain mobile services, including the MBMS.

The MBMS may refer to the evolved MBMS (eMBMS) or the Further evolved MBMS (FeMBMS), depending on the mobile communication technology utilized by the mobile communication network 120. For example, if the mobile communication network is a 4G mobile communication network (e.g., an LTE/LTE-A/TD-LTE network), the MBMS may refer to the eMBMS. Alternatively, if the mobile communication network is a 5G mobile communication network (e.g., a New Radio (NR) network), the MBMS may refer to the FeMBMS.

The mobile communication device 110 may be a smartphone, a wearable electronic apparatus, a panel Personal Computer (PC), a laptop computer, or any computing device supporting the mobile communication technology utilized by the mobile communication network 120.

The mobile communication network 120 may include an access network 121 and a core network 122. The access network is responsible for processing radio signals, terminating radio protocols, and connecting the mobile communication device 110 with the core network 122. The core network 122 is responsible for performing mobility management, network-side authentication, and interfaces with public/external networks (e.g., the Internet). The access network 121 and the core network 122 may each include one or more network nodes for carrying out said functions.

In one embodiment, the mobile communication network 120 may be a 4G mobile communication network (e.g., an LTE/LTE-A/TD-LTE network), and the access network 121 and the core network 122 may be an Evolved Universal Terrestrial Radio Access Network (EUTRAN) and an Evolved Packet Core (EPC), respectively.

The E-UTRAN may include one or more 4G base stations (or called evolved NodeB (eNB)). Each 4G base station may refer to a macro eNB, pico eNB, or femto eNB. Each 4G base station may form one or more cells to provide wireless accesses to the mobile communication device 110, including delivering system broadcast information (e.g., a Master Information Block (MIB) and System Information Blocks type 1~13 (SIBS 1~13)) to the mobile communication device 110. For example, the mobile communication device 110 may camp on one or more cells, wherein the camped cells may be referred to as serving cells.

The EPC may include a Home Subscriber Server (HSS), a Mobility Management Entity (MME), a Serving Gateway (S-GW), a Packet Data Network Gateway (PDN-GW or P-GW), an MBMS Gateway (MBMS-GW), and a Broadcast-Multicast Service Center (BM-SC).

In another embodiment, the mobile communication network 120 may be a 5G mobile communication network (e.g., an NR network), and the access network 121 and the core network 122 may be a Next Generation Radio Access Network (NG-RAN) and a Next Generation Core Network (NG-CN), respectively.

The NG-RAN may include one or more base stations, such as next generation NodeBs (gNBs), which support high frequency bands (e.g., above 24 GHz), and each gNB may further include one or more Transmission Reception Points (TRPs). Each gNB and TRP may be referred to as a 5G base station.

Each 5G base station may form one or more cells to provide wireless accesses to the mobile communication device 110, including the provision of the MIB and SIBs 1~13 to the mobile communication device 110. For example, the mobile communication device 110 may camp on one or more cells, wherein the camped cells may be referred to as serving cells.

The NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure. In addition, the NG-CN may further include an MBMS-GW and a BM-SC for providing the MBMS.

In general, the mobile communication device 110 may be called a User Equipment (UE) or Mobile Station (MS). The mobile communication device 110 may selectively connect to at least one base station of the access network 121 based on its current location when moving, to obtain mobile services, including the MBMS.

Figure 2:
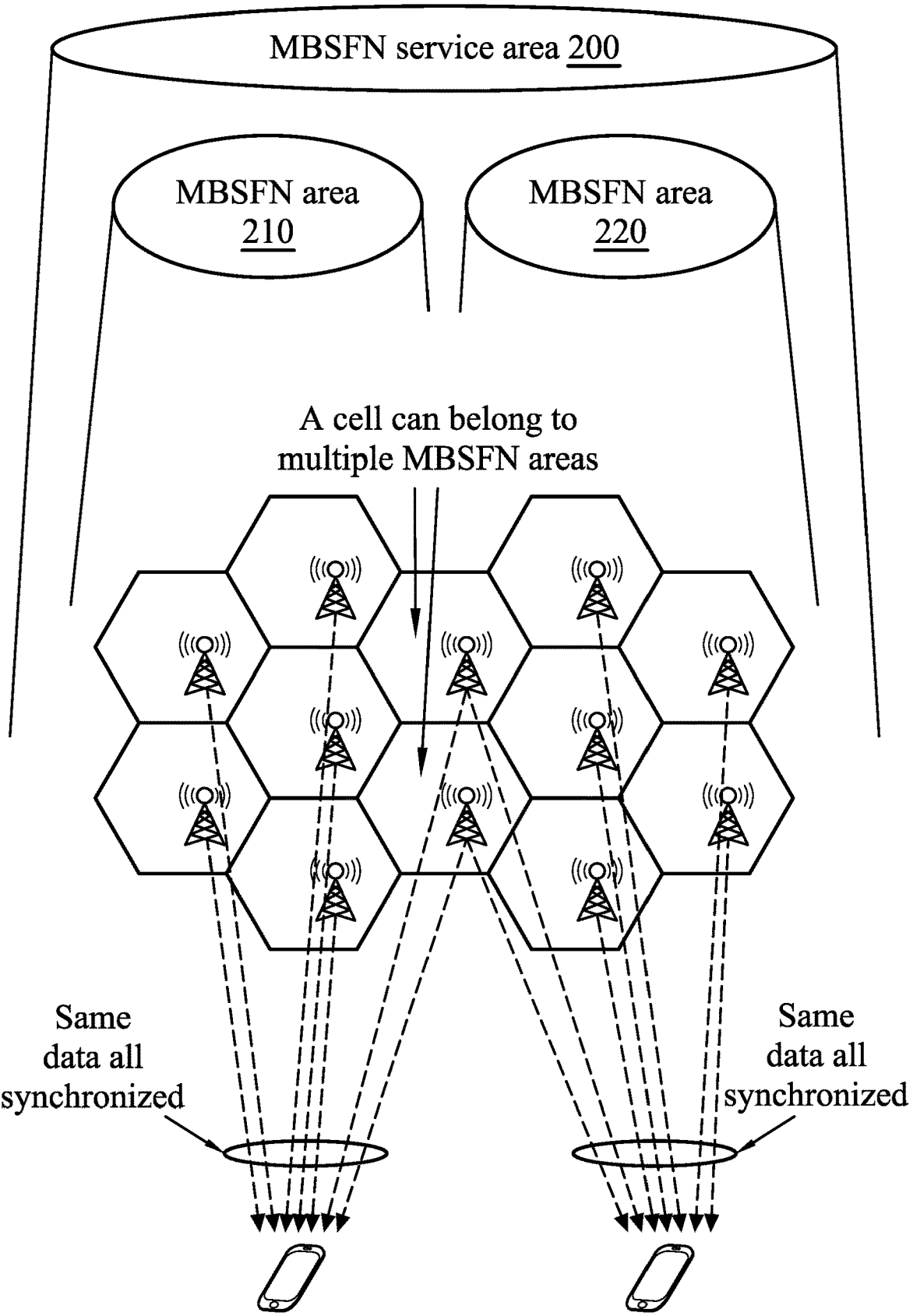
FIG. 2 is a schematic diagram illustrating a Multicast Broadcast Single Frequency Network (MBSFN) according to an embodiment of the application.

FIG. 2 is a schematic diagram illustrating a Multicast Broadcast Single Frequency Network (MBSFN) according to an embodiment of the application.

In contrast to the Broadcast Channel (BCH) which can only carry cell broadcast messages that contain small amount of texts with limited information, the MBMS is supported by the Multicast Channel (MCH) which may provide various and rich media streaming services, including the high-bandwidth video streaming services (e.g., Live Internet Protocol (IP) TV (IPTV) and Video over IP (VoIP)). In order to avoid the bandwidth and radio resources being used up with the growing possibility of many users using high-bandwidth video streaming services in the same service area, the base stations of the access network 121 may be organized as an MBSFN in which neighboring cells may be grouped to form a large service area (or called MBSFN service area). In each MBSFN service area, the coordinated multi-point (CoMP) transmission technique may be used to synchronize the transmission operations in the cells to reduce interference between adjacent cells and improve radio resource utilization.

As shown in FIG. 2, the MBSFN service area 200 may include multiple MBSFN areas 210~220. Each MBSFN area may include one or more cells formed by one or more base stations, and the base stations in the same MBSFN area will synchronize their transmission operations to the mobile communication device in the same MBSFN area. It should be understood that the cells formed by some base stations may belong to more than one MBSFN area. That is, the coverage of the MBSFN areas 210~220 may overlap, depending on the cell grouping configuration.

Figure 3:
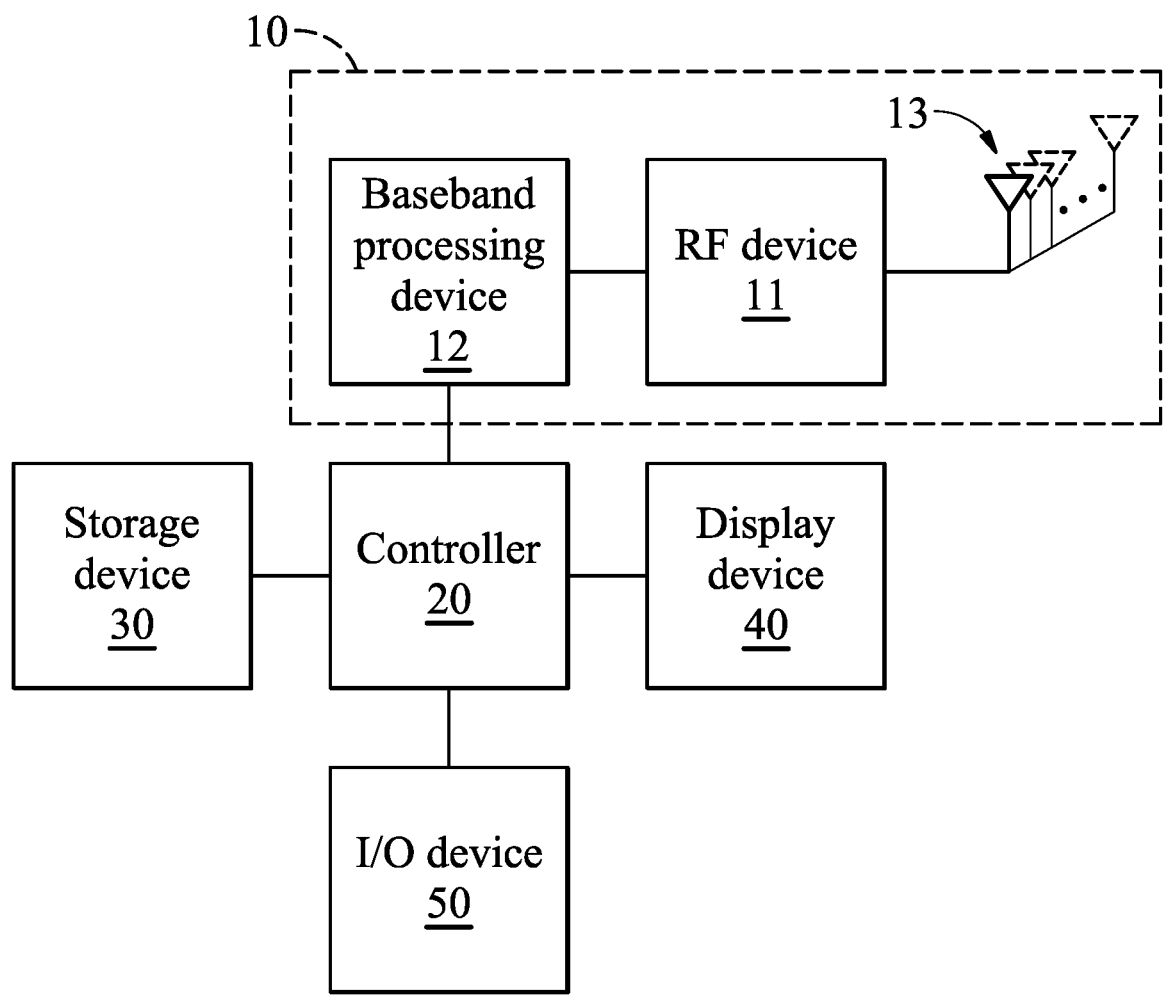
FIG. 3 is a block diagram illustrating an exemplary hardware architecture of the mobile communication device 110 according to an embodiment of the application.

FIG. 3 is a block diagram illustrating an exemplary hardware architecture of the mobile communication device 110 according to an embodiment of the application.

As shown in FIG. 3, the mobile communication device 110 may include a wireless transceiver 10, a controller 20, a storage device 30, a display device 40, and an Input/Output (I/O) device 50.

The wireless transceiver 10 is configured to perform wireless transmission and reception to and from the mobile communication network 120 using a mobile communication technology.

Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity cards (denoted as C1 and C2) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technology, wherein the radio frequency may be 900 MHz, 2100 MHz, or 2.6 GHz utilized in the 4G mobile communication technology (e.g., the LTE/LTE-A/TD-LTE technology), or may be 24 GHz-300 GHz utilized in the 5G mobile communication technology (e.g., the NR technology), or another radio frequency, depending on the mobile communication technology in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the mobile communication network 120, storing and retrieving data (e.g., program code of an Operation System (OS), such as Android or iOS) to and from the storage device 30, sending a series of frame data (e.g. representing text messages, graphics, images, etc.) to the display device 40, and receiving user inputs or outputting signals via the I/O device 50. In particular, the controller 20 coordinates the aforementioned operations of the wireless transceiver 10, the storage device 30, the display device 40, and the I/O device 50 for performing the method for MBMS-based emergency broadcast.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. More specifically, the controller 20 may include three components, including a control unit, an Arithmetic Logic Unit (ALU), and a register, but the application is not limited thereto. The control unit is responsible for controlling function executions according to the instructions in program code. The ALU is responsible for performing arithmetic and bitwise operations on integer binary numbers. The register may be realized with a single piece of hardware to store data for arithmetic and bitwise operations and instructions to be executed by the control unit, or may be realized with two independent pieces of hardware to separately store data for arithmetic and bitwise operations and instructions to be executed by the control unit.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, an OS, and/or the method for MBMS-based emergency broadcast.

The display device 40 may be a Liquid-Crystal Display (LCD), a Light-Emitting Diode (LED) display, an Organic LED (OLED) display, or an Electronic Paper Display (EPD), etc., for providing a display function.

In another embodiment, the display device 40 may further include one or more touch sensors disposed thereon or thereunder for sensing touches, contacts, or approximations of objects (e.g., fingers or styluses), thereby enabling the display device 40 to be a touch-sensitive display device.

The I/O device 50 may include one or more buttons, a keyboard, a mouse, a touch pad, a video camera, a microphone, a speaker, and/or sensors (e.g., a barometric/temperature sensor, a humidity sensor, and/or a blood-pressure/heart-rate/body-temperature sensor), etc., to serve as the Man-Machine Interface (MMI) for interaction with users.

It should be understood that the components described in the embodiment of FIG. 3 are for illustrative purposes only and are not intended to limit the scope of the application. For example, the mobile communication device 110 may include more subscriber identity cards or more components, such as a Global Positioning System (GPS) device for use of some location-based services or applications, and/or a battery for powering the other components of the mobile communication device 110, etc. Alternatively, the mobile communication device 110 may include fewer components. For example, the mobile communication device 110 may not include the display device 40 and/or the I/O device 50.

Figure 4A:
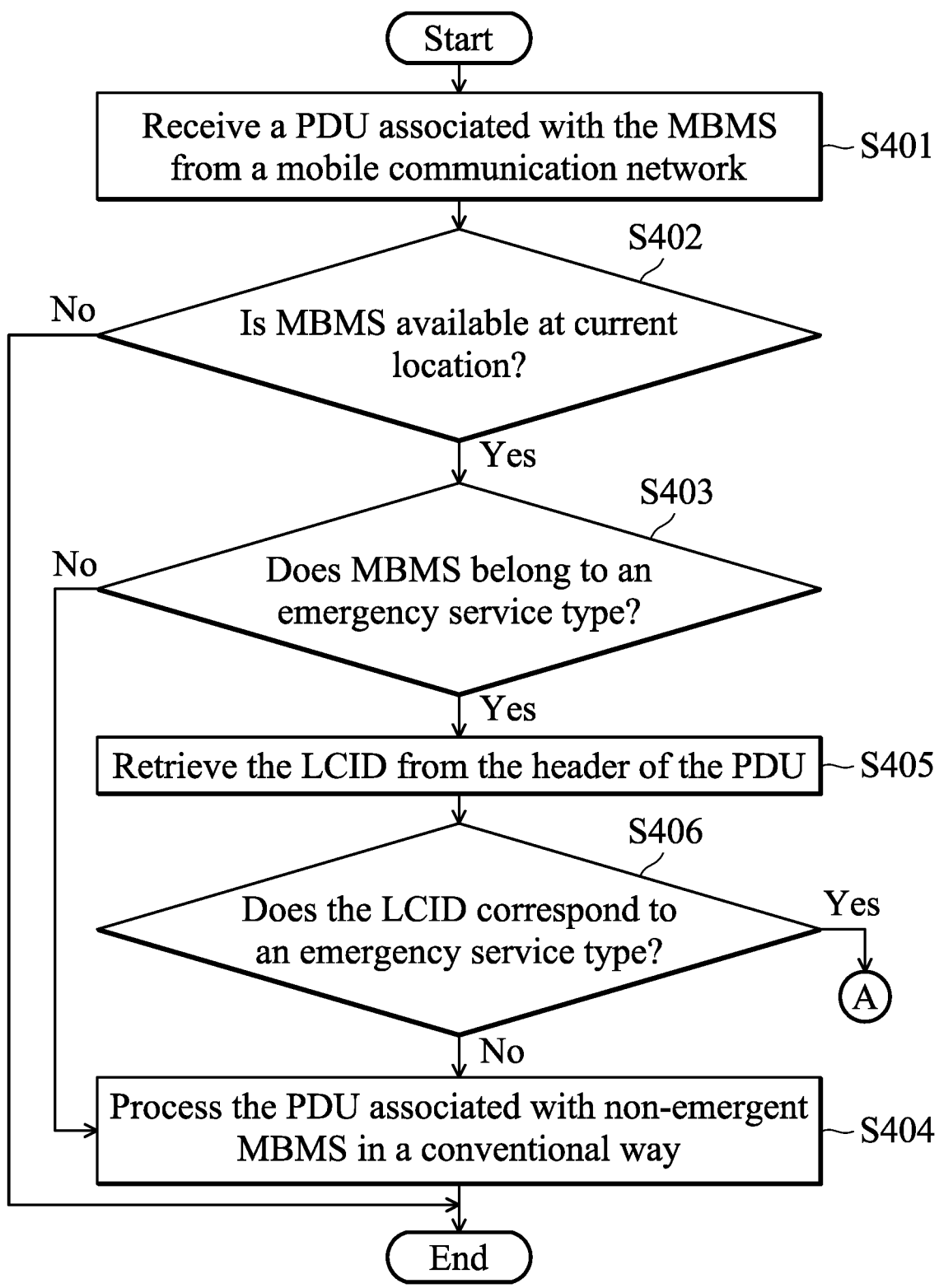
FIGS. 4A and 4B show a flow chart of the method for MBMS-based emergency broadcast according to an embodiment of the application.
Figure 4B:
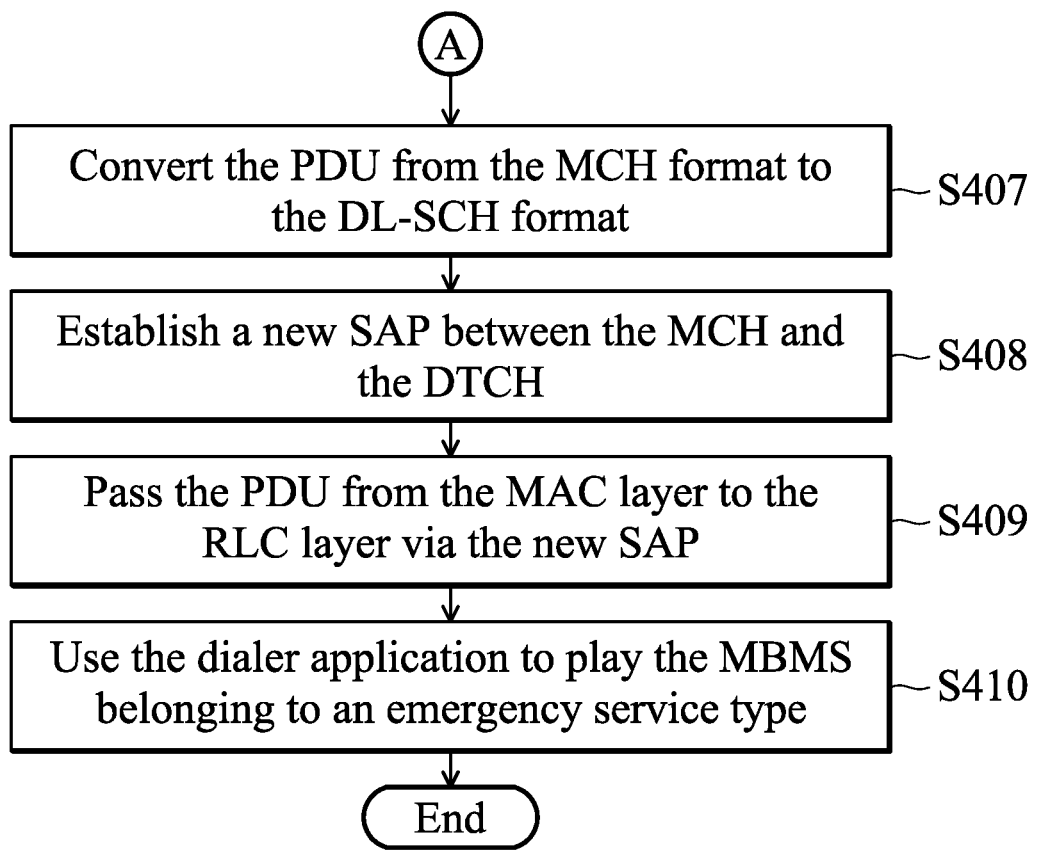

FIGS. 4A and 4B show a flow chart of the method for MBMS-based emergency broadcast according to an embodiment of the application.

In this embodiment, the method for MBMS-based emergency broadcast is applied to and executed by a mobile communication device (e.g., the mobile communication device 110) which at least includes a wireless transceiver (e.g., the wireless transceiver 10).

In step S401, the mobile communication device receives a Protocol Data Unit (PDU) associated with the MBMS from a mobile communication network. For example, the PDU may be a Media Access Control (MAC) PDU.

In step S402, the mobile communication device determines whether the MBMS is available at the location of the mobile communication device according to the SIB 2. Specifically, if the SIB 2 broadcasted in a cell includes the time resource configuration for MBMS (e.g., present in the MBSFN-SubframeConfigList Information Element (IE)), the mobile communication device may determine that the MBMS is available in this cell. Otherwise, if the SIB 2 broadcasted in a cell does not include the time resource configuration for MBMS, the mobile communication device may determine that the MBMS is not available in this cell.

Subsequent to step S402, if the MBMS is not available at the current location of the mobile communication device, the method ends. If the MBMS is available at the current location of the mobile communication device, the method proceeds to step S403.

In step S403, the mobile communication device determines whether the MBMS belongs to an emergency service type according to the Mobile Country Code (MCC) and the MBMS service ID in the SIB 13.

Specifically, the MCC and the MBMS service ID are carried in the Temporary Mobile Group Identity (TMGI) IE of the SIB 13. The content of the TMGI IE is show below in table 1.

TABLE 1

| 8 | 7 | 6 | 5 | 4 | 3 | 2 | 1 | |
|---|---|---|---|---|---|---|---|---|
| Temporary Mobile Group Identity IEI ||||||||  Octet 1 |
| Length of Temporary Mobile Group Identity contents |||||||| Octet 2 |
| MBMS Service ID |||||||| Octet 3 |
| |||||||| Octet 4 |
| |||||||| Octet 5 |
| MCC digit 2 |||| MCC digit 1 |||| Octet 6 |
| MNC digit 3 |||| MCC digit 3 |||| Octet 7 |
| MNC digit 2 |||| MNC digit 1 |||| Octet 8 |

For example, the operator of the mobile communication network may use predetermined values of the MCC and the MBMS service ID as an indication of an emergency (or mission-critical) service type. This way, the mobile communication device may determine that the MBMS belongs to an emergency service type when it finds that the MCC and the MBMS service ID in the SIB 13 are set to the predetermined values. Otherwise, the mobile communication device may determine that the MBMS does not belong to an emergency service type when it finds that the MCC and the MBMS service ID in the SIB 13 are set to other values.

Subsequent to step S403, if the MBMS does not belong to an emergency service type, the method proceeds to step S404. If the MBMS belongs to an emergency service type, the method proceeds to step S405.

In step S404, the mobile communication device processes the PDU associated with non-emergent MBMS in a conventional way, and the method ends.

In step S405, the mobile communication device retrieves the Logical Channel Identifier (LCD) from the header of the PDU.

In step S406, the mobile communication device determines whether the LCID corresponds to an emergency service type.

In one embodiment, if the mobile communication network is a 4G mobile communication network, then the value 11101 of the LCID may be used to indicate that the LCD corresponds to an emergency service type, as shown below in table 2.

TABLE 2

Values of LCID for MCH

| Index | LCID values |
|---|---|
| 00000 | MCCH |
| 00001-11100 | MTCH |
| 11101 | Emergency |
| 11110 | MCH Scheduling Information |
| 11111 | Padding |

Subsequent to step S406, if the LCD does not correspond to an emergency service type, the method proceeds to step S404. If the LCD corresponds to an emergency service type, the mobile communication device convert the PDU to a format which allows the dialer application to play the MBMS (steps S407~S409).

In step S407, the mobile communication device converts the PDU from the Multicast Channel (MCH) format to the Downlink Shared Channel (DL-SCH) format.

Specifically, in the MAC layer, the transmission and reception of the PDUs associated with the MBMS are mapped to the MCH, while the transmission and reception of the PDUs associated with a voice call are mapped to the DL-SCH. In order to enable the MBMS to be played by the dialer application, the header of the PDU associated with the MBMS needs to be converted to the DL-SCH format in the MAC layer.

Figure 5:
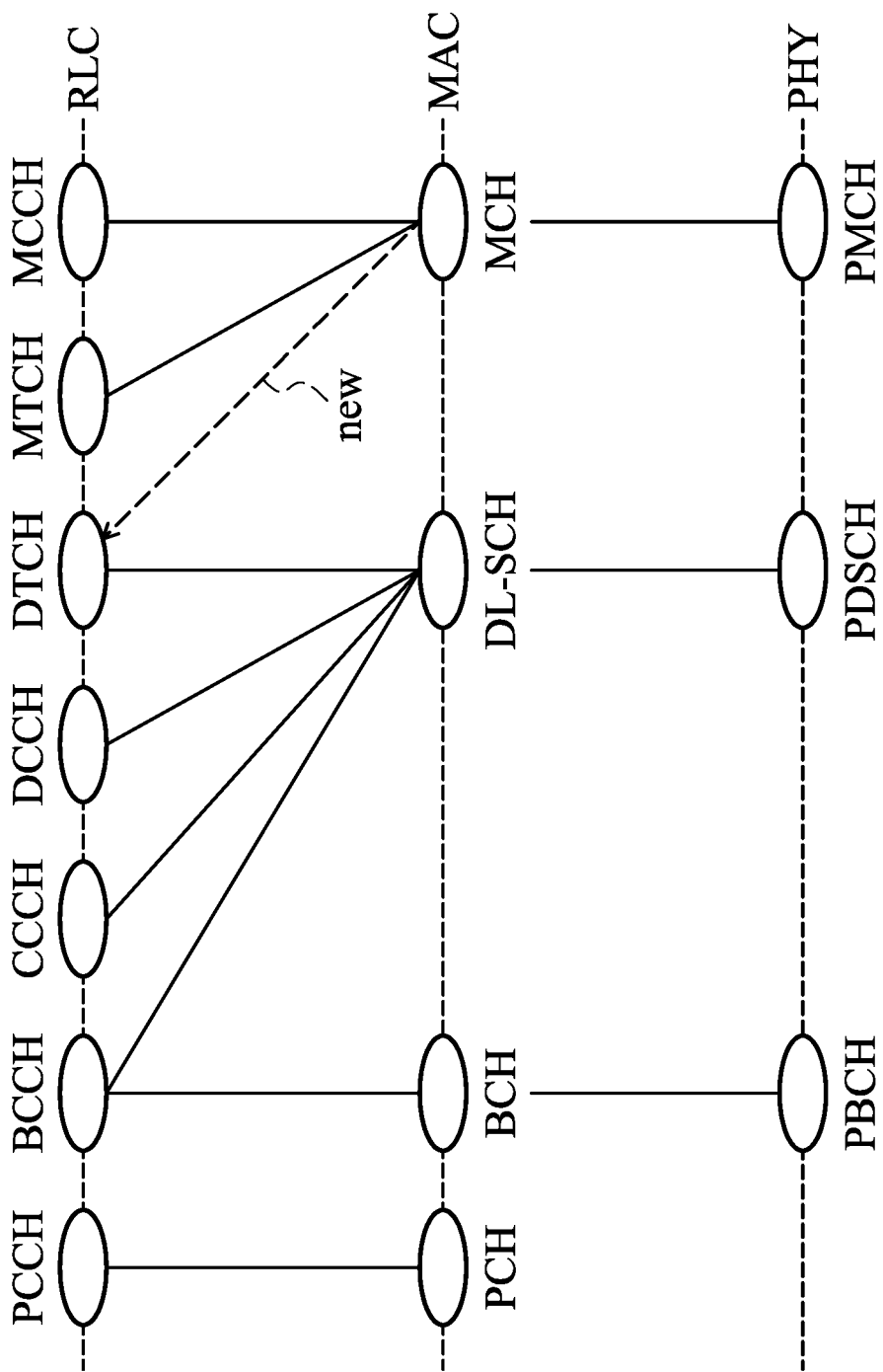
FIG. 5 is a schematic diagram illustrating the mapping between transport channels and logical channels according to an embodiment of the application.

In step S408, the mobile communication device establishes a new Service Access Point (SAP) between the MCH in the MAC layer and the Downlink Traffic Channel (DTCH) in the Radio Link Control (RLC) layer, as shown in FIG. 5.

In step S409, the mobile communication device passes the PDU from the MAC layer to the RLC layer via the new SAP.

To further clarify, the format of the PDU associated with the MBMS includes a header and a payload. The header may include one or more sub-headers for describing the content in the payload. The LCD value in each sub-header may be used to identify different LCIDs or control elements. Note that there is a difference between the MCH format and the DL-SCH format in the MAC layer. If the LCID value in the sub-header of the PDU received via the MCH is set to 11101 (i.e., the value corresponding to the MBMS), the mobile communication device may convert the LCID value 11101 to another LCID value (e.g., 01011-10111) applicable for the DL-SCH, as shown below in table 3. This way, the PDU may remain to be associated with the MBMS after converted to the DL-SCH format. Next, the new LCID value (e.g., 01011-10111) and the original payload may be encapsulated as a MAC PDU for DL-SCH, and the MAC PDU for DL-SCH may be passed to the RLC layer to be processed with the DL-SCH decoding rule.

TABLE 3

Values of LCID for DL-SCH

| Index | LCID values |
|---|---|
| 00000 | CCCH |
| 00001-01010 | Identity of the logical channel |
| 01011-10111 | Emergency |
| 11000 | Activation/Deactivation (4 octets) |
| 11001 | SC-MCCH, SC-MTCH |
| 11010 | Long DRX Command |
| 11011 | Activation/Deactivation (1 octet) |
| 11100 | UE Contention Resolution Identity |
| 11101 | Timing Advanced Command |
| 11110 | DRX Command |
| 11111 | Padding |

In step S410, the mobile communication device uses the dialer application to play the MBMS belonging to an emergency service type, and the method ends. In one embodiment, the mobile communication device may mute the microphone function of the dialer application when the dialer application is playing the MBMS.

Specifically, steps S401~S409 may be performed by a modem (e.g., the wireless transceiver 10) in the hardware of the mobile communication device, while step S410 may be performed by enabling the modem to communicate with the Radio Interface Layer (RIL), to inform the upper layer with an alert request or call connect request to play the MBMS as a general phone call.

Figure 6:
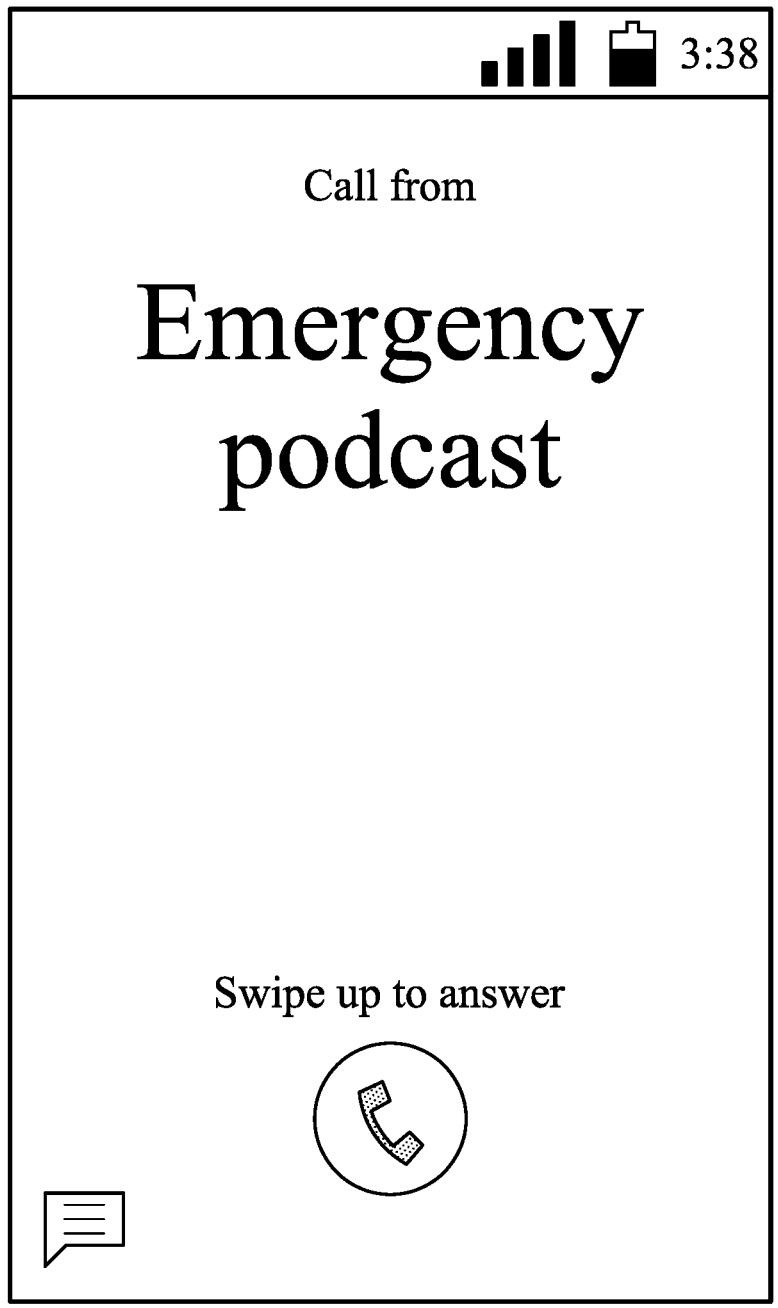
FIG. 6 is a schematic diagram illustrating the user interface of a dialer application playing an MBMS belonging to an emergency service type according to an embodiment of the application.

FIG. 6 is a schematic diagram illustrating the user interface of a dialer application playing an MBMS belonging to an emergency service type according to an embodiment of the application.

As shown in FIG. 6, when a PDU associated with the MBMS belonging to an emergency service type is received, the dialer application is triggered to show that an emergency podcast is coming. In response, the user may perform the normal answering procedure (e.g., swipe up the displayed icon) to play the emergency podcast.

Figure 7:
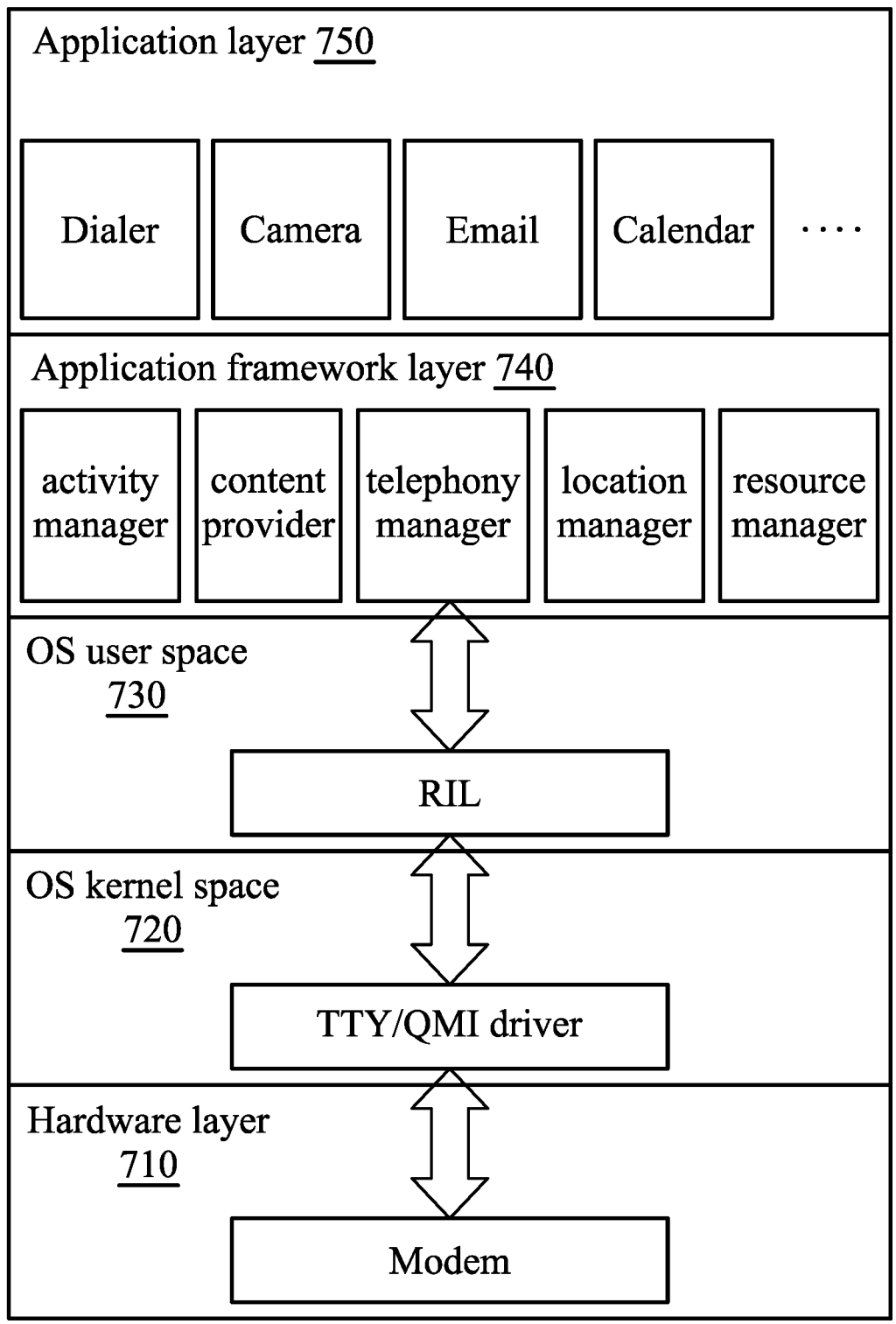
FIG. 7 is a block diagram illustrating an exemplary software architecture of the mobile communication device 110 according to an embodiment of the application.

FIG. 7 is a block diagram illustrating an exemplary software architecture of the mobile communication device 110 according to an embodiment of the application.

As shown in FIG. 7, the software architecture may include a hardware layer 710, an OS (e.g., Linux) kernel space 720, an OS user space 730, an application framework layer 740, and an application layer 750.

The hardware layer 710 may include at least a modem (e.g., the wireless transceiver 10) to provide mobile services. The hardware layer 710 may communicate with the applications in the application layer 750 via the TTY/QMI drivers in the OS kernel space 720.

The OS kernel space 720 may include the serial interface TTY for AT command, and/or the Qualcomm chip driver QMI (Qualcomm Message Interface).

The OS user space 730 may include an RIL serving as the abstraction layer between the modem in the hardware layer 710 and the applications in the application layer 450.

The application framework layer 740 may include multiple function blocks, such as the activity manager, the content provider, the telephony manager, the location manager, and the resource manager. Each function block collects different libraries and functions of the OS, wherein the libraries and functions may be called by the applications in the application layer 750 to access the resources of the mobile communication device 110.

The application layer 750 may include various applications, such as a dialer application (e.g., the Android/iOS native dialer application), a camera application, an email application, and a calendar application, etc.

It should be noted that the modem in the present application is not only capable of providing standard 4G/5G signaling, but also capable of communicating with the RIL via the TTY/QMI drivers to inform the upper layer through an alert request or call connect request to play the MBMS belonging to an emergency service type as a general phone call.

In addition, the application layer 750 may not include the custom application which is dedicated for MBMS and is developed by the operator of the mobile communication network 120 (i.e., it may not be necessary to install such a custom application for MBMS in the mobile communication device 110), and the MBMS belonging to an emergency service type may be played simply using the native dialer application of the OS. Alternatively, the application layer 750 may include the custom application which is dedicated for MBMS and is developed by the operator of the mobile communication network 120, but such a custom application is used only for the MBMS not belonging to an emergency service type.

Figure 8:
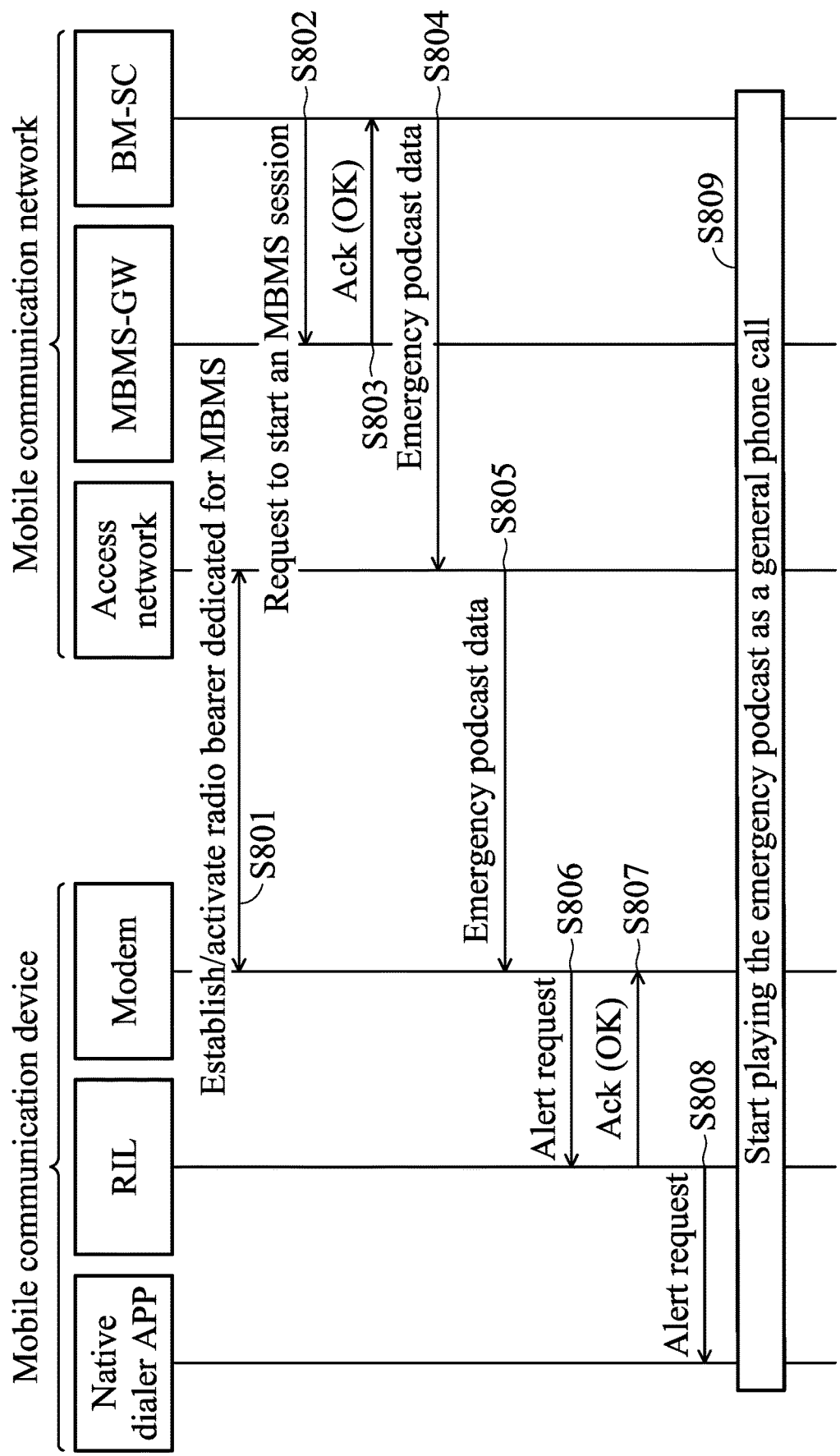
FIG. 8 is a message sequence chart of enabling a dialer application to play an MBMS belonging to an emergency service type according to an embodiment of the application.

FIG. 8 is a message sequence chart of enabling a dialer application to play an MBMS belonging to an emergency service type according to an embodiment of the application.

In step S801, a radio bearer dedicated for MBMS is established and activated between the mobile communication device and the mobile communication network.

In step S802, the BM-SC sends a request to the MBMS-GW to start an MBMS session.

In step S803, the MBMS-GW replies to the BM-SC with an acknowledgement.

In step S804, the BM-SC sends the emergency podcast data (i.e., the data of the MBMS belonging to an emergency service type) to the access network via the MBMS-GW.

In step S805, the access network sends the emergency podcast data to the modem.

In step S806, the modem determines that the emergency podcast data is associated with the MBMS belonging to an emergency service type, and then sends a request to the RIL for popping an alert.

In step S807, the RIL replies to the modem with an acknowledgement.

In step S808, the RIL informs the dialer application of the alert request.

In step S809, the dialer application pops an alert on the user interface and starts playing the emergency podcast session as a general phone call as soon as the user answers the alert.

In view of the forgoing embodiments, it will be appreciated that the present application proposes to deliver sufficient disaster hedge information via MBMS-based emergency broadcast to all mobile communication devices in an area within the cell coverage of certain base stations when major disaster (e.g., earthquake, tsunami, or fire) strikes in that area. Conventionally, if a major accident occurs in a tunnel, the people in the tunnel need to turn on the radio and tune in to a particular frequency before they can hear the disaster hedge information from the radio. By contrast, in the present application, the base stations in the tunnel area may send the disaster hedge information to all mobile communication devices in the tunnel via MBMS-based emergency broadcast, and the users may get the disaster hedge information promptly. Moreover, the method for MBMS-based emergency broadcast proposed in the present application allows the mobile communication device to play the MBMS using the native dialer application. Advantageously, the mobile communication device is not required to be additionally installed with the custom application which is developed by the network operator for MBMS.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A mobile communication device, comprising:
    a wireless transceiver, configured to perform wireless transmission and reception to and from a mobile communication network; and
    a controller, coupled to the wireless transceiver, and configured to receive a Protocol Data Unit (PDU) associated with a Multimedia Broadcast Multicast Service (MBMS) from the mobile communication network via the wireless transceiver, and convert the PDU to a format which allows a dialer application to play the MBMS in response to the MBMS belonging to an emergency service type;
    wherein the PDU is a Media Access Control (MAC) PDU, and the format conversion of the PDU comprises:
        converting the PDU from a Multicast Channel (MCH) format to a Downlink Shared Channel (DL-SCH) format;
        establishing a Service Access Point (SAP) between the MCH in a MAC layer and a Downlink Traffic Channel (DTCH) in a Radio Link Control (RLC) layer; and
        passing the PDU from the MAC layer to the RLC layer via the SAP.

2. The mobile communication device as claimed in claim 1, wherein the dialer application is a native dialer application of an Operating System (OS).

3. The mobile communication device as claimed in claim 1, wherein the MBMS is an evolved MBMS (eMBMS) when the mobile communication network is a fourth generation (4G) network; or the MBMS is a Further evolved MBMS (FeMBMS) when the mobile communication network is a fifth generation (5G) network.

4. The mobile communication device as claimed in claim 1, wherein the controller is further configured to receive system broadcast information from the mobile communication network via the wireless transceiver, and determine whether the MBMS belongs to the emergency service type according to the system broadcast information.

5. The mobile communication device as claimed in claim 4, wherein the system broadcast information comprises a System Information Block type 2 (SIB 2) and a System Information Block type 13 (SIB 13), and the controller is further configured to determine whether the MBMS is available at a location of the mobile communication device according to the SIB 2, and determine whether the MBMS belongs to the emergency service type according to a Mobile Country Code (MCC) and an MBMS service ID in the SIB 13 in response to the MBMS being available at the location of the mobile communication device.

6. The mobile communication device as claimed in claim 1, wherein the controller is further configured to retrieve a Logical Channel Identifier (LCID) from a header of the PDU in response to the MBMS belonging to the emergency service type, and the converting of the PDU to the format which allows the dialer application to play the MBMS is performed in response to the LCID corresponding to the emergency service type.

7. The mobile communication device as claimed in claim 1, wherein the controller is further configured to mute a microphone function of the dialer application when the dialer application is playing the MBMS.

8. A method for MBMS-based emergency broadcast, executed by a mobile communication device, the method comprising:
   receiving a PDU associated with an MBMS from a mobile communication network; and
   converting the PDU to a format which allows a dialer application to play the MBMS in response to the MBMS belonging to an emergency service type;
   wherein the PDU is a MAC PDU, and the format conversion of the PDU comprises:
      converting the PDU from an MCH format to a DL-SCH format;
      establishing an SAP between the MCH in a MAC layer and a DTCH in an RLC layer; and
      passing the PDU from the MAC layer to the RLC layer via the SAP.

9. The method as claimed in claim 8, wherein the dialer application is a native dialer application of an OS.

10. The method as claimed in claim 8, wherein the MBMS is an eMBMS when the mobile communication network is a 4G network; or the MBMS is a FeMBMS when the mobile communication network is a 5G network.

11. The method as claimed in claim 8, further comprising:
   receiving system broadcast information from the mobile communication network; and
   determining whether the MBMS belongs to the emergency service type according to the system broadcast information.

12. The method as claimed in claim 11, wherein the system broadcast information comprises a SIB 2 and a SIB 13, and the method further comprises:
   determining whether the MBMS is available at the location of the mobile communication device according to the SIB 2; and
   determining whether the MBMS belongs to the emergency service type according to an MCC and an MBMS service ID in the SIB 13 in response to the MBMS being available at the location of the mobile communication device.

13. The method as claimed in claim 8, further comprising:
   retrieving an LCID from a header of the PDU in response to the MBMS belonging to the emergency service type;
   wherein the converting of the PDU to the format which allows the dialer application to play the MBMS is performed in response to the LCID corresponding to the emergency service type.

14. The method as claimed in claim 8, further comprising:
   muting the microphone function of the dialer application when the dialer application is playing the MBMS.

\* \* \* \* \*